United States Patent [19]

Waibel

[11] 4,188,148
[45] Feb. 12, 1980

[54] FASTENER ASSEMBLY

[75] Inventor: Helmut K. Waibel, Hayward, Calif.

[73] Assignee: Durango Systems, Inc., San Jose, Calif.

[21] Appl. No.: 943,787

[22] Filed: Sep. 20, 1978

[51] Int. Cl.² .................... B25G 3/00; F16B 5/00
[52] U.S. Cl. .................................. 403/258; 403/407
[58] Field of Search ............ 403/231, 405, 407, 408, 403/257, 258, 264; 217/13, 45, 12 R, 43 R, 65

[56] References Cited

U.S. PATENT DOCUMENTS

| 1,346,518 | 7/1920 | Waggoner | 403/258 X |
| 2,040,374 | 5/1936 | Grimes | 403/408 X |
| 2,611,633 | 9/1952 | Webster | 403/231 X |
| 2,993,573 | 7/1961 | Bloedow | 403/258 |

FOREIGN PATENT DOCUMENTS 2406227 2/1975 Fed. Rep. of Germany ........... 403/264

Primary Examiner—Wayne L. Shedd
Attorney, Agent, or Firm—Thomas E. Schatzel

[57] ABSTRACT

A fastener assembly for mounting and securing two structural members in abutting relationship with each other. The assembly includes a planar unitary anchor member of a substantially "P" shape and wherein one of the structural members to be assembled has a notch comprising a pair of intersecting perpendicular slots to form a substantial T-shaped pattern about an edge of said structural member with the anchor member pressfit into one of said slots with the planar surface of the anchor member normal to the planar surfaces of the structure member and normal to said other slot of said notch; and a locking pin member for engaging a second structure member and including locking means for locking the pin to the anchor member.

8 Claims, 4 Drawing Figures

U.S. Patent  Feb. 12, 1980  4,188,148
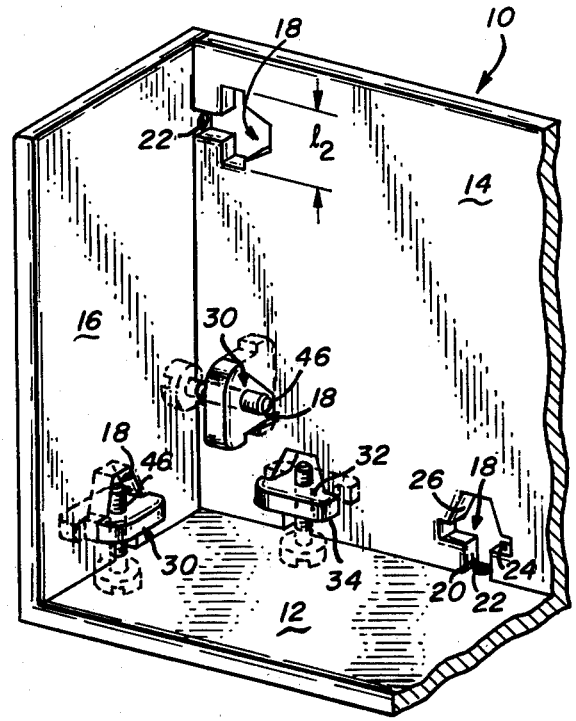
Fig_1
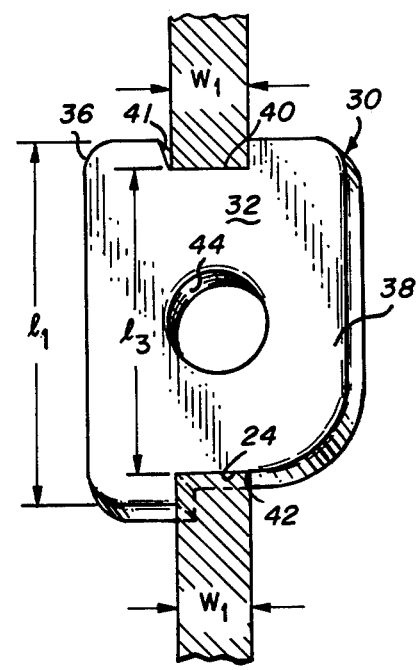
Fig_2
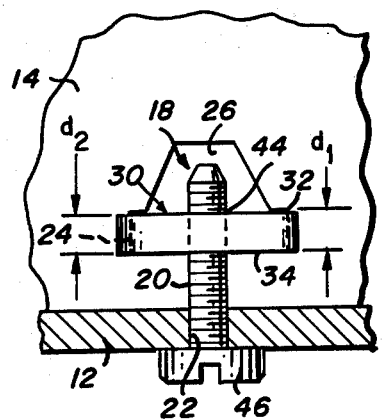
Fig_3
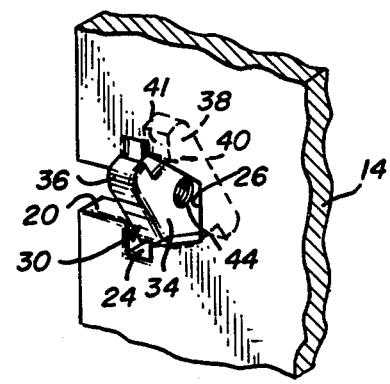
Fig_4

FASTENER ASSEMBLY

BACKGROUND OF THE INVENTION

1. Field of the Invention

The present invention relates to fastener assemblies for securing two structural members in place relative to one another and more particularly to an assembly wherein an anchor member may be press-fit into a slot within one of the structural members and a locking pin engages another of the structural members and locks to the anchor member.

1. Description of the Prior Art

There are numerous means for fastening two structural members together. For example, nuts and bolts of numerous shapes, sizes and dimensions are well known in the prior art. Also, it is known to use fastener assemblies wherein the anchor member is anchored to one of the structural members. Such fasteners are avaiable for mounting structural members relative to one another and wherein the materials are of various different compositions, e.g., metal, plastic, etc.

However, in the small business machine industries, for example, office machines such as typewriters, printers, dictating equipment, data processing equipment, etc., there is a constant demand for improved fastner assemblies capable of securing chassis parts such that such office machines can be economically produced in large volumes. Thus, it is desirable to have fastener assemblies which can be economically produced, are simple to apply, are removable, are reuseable, are self-retaining and which can be mounted preferably without the use of any special tools and without the need of any special skills.

In recent years there have been rapid advancements in electronics and data processing equipment. Also, there is constant need and demand for more efficient operating office procedures and office equipment. Thus, there is a constant demand in the mechanical arts for structures capable of housing the electronics and data processing equipment parts which structures lend themselves to economy so that the net costs for such equipment lends itself for wider use.

SUMMARY OF THE PRESENT INVENTION

It is an object of the present invention to provide a fastener assembly which is economical to manufacture and which may be used in small machine applications.

It is a further object of the present invention to provide a fastener assembly system which allows for the removal of one part relative to the other with mere manipulation of the fastener assembly.

It is a further object of the present invention to provide a fastener assembly which is reusable.

It is a further object of the present invention to provide a fastener assembly which does not require any special tools to arrange.

It is a further object of the present invention to provide a fastener assembly having an anchor member engagable to one of the structural members so as to abut the structural member along at least three surfaces with two of such surfaces being normal to each other.

It is a further object of the present invention to provide a fastener assembly wherein the anchor member is retained in place when disengaged from the anchor pin.

A preferred embodiment of the present invention includes a unitary anchor member having planar parallel surfaces. The anchor member is shaped with a main leg portion and a reverse C-shaped portion intersecting the main leg portion to form a substantially P-shaped configuration and with a groove in the top cross surface of said P-shape. An aperture extends through the anchor member and normal to the planar surfaces. The assembly further includes a first structure member having at least a first planar surface with a notch configured to include a pair of perpendicular intersecting slots forming a substantial T-shaped pattern with the cross member portion extending parallel to the edge of the structure member and the leg portion intersecting the edge of the member. The length of said cross member portion is less than the length of the main leg portion of the anchor member and approximately equal to the distance between the points of intersection of the main leg and the reversed C-portion of the anchor member. Thus, the anchor pin may be press fit into said cross member slot with the side edge surfaces of the main leg of the anchor in abutment with the planar surface of the first structure member and the side edge surfaces of the reverse C-portion of the anchor member in abutment with the interior terminal edge surfaces of said cross member slot. A locking pin engages a second structure member and is positioned within the aperture of the anchor member with means for anchoring the pin to said anchor member.

These and other objects and advantages of the present invention will no doubt become apparent after a reading of the following detailed description of the preferred embodiment which is illustrated in several figures in the drawing.

IN THE DRAWINGS

FIG. 1 is a partial perspective view of structural panels of a machine chassis incorporating the fastener assembly of the present invention;

FIG. 2 is a perspective view of an anchor member anchored to a structure member in accordance with the present invention;

FIG. 3 is a partial side view of assembled structural members incorporating the fastener assembly of the present invention; and FIG. 4 is a perspective view of a section of a structural panel and an anchor member of the present fastener assembly illustrating how the anchor member may be inserted.

DETAILED DESCRIPTION OF THE PREFERRED EMBODIMENT

The drawing illustrates a partial housing, referred to by the general reference character 10, for office business machines, e.g., a printer. The illustrated housing 10 includes an aluminum chassis having a base planar structural wall 12, a planar structural side wall 14 and a planar rear wall 16 which are joined together to form the chassis. As illustrated, the structural wall 14 carries a triangular-shaped notch, referred to by the general reference character 18. The notch 18 has a slot 20 opening to the edge thereof and in line with an aperture 22 in the adjoining structural wall 12 or 16. The notch 18 further comprises a rectangular-shaped slot 24 which intersects the slot 20 to establish a substantially T-shaped slot configuration between the rectangular-shaped slots 20 and 24. The notch 18 further has a triangular-shaped opening 26 projecting from the slot 24 with the apex of the opening 26 aligned with the slot 20.

Within the rectangular slot 24 is a unitary anchor member referred to by the general reference character 30. The anchor member 30 comprises two opposing parallel planar surfaces 32 and 34 configured with a main leg segment 36 and a reverse C-shaped portion 38. The member 30 is formed with the main leg 36 and portion 38 to establish a substantially P-shaped configuration with a groove 40 in the top cross surface of said P-shaped configuration. The groove 40 has a tapered wall 41 which is tapered outwardly as it extends from the floor of the groove 40. The anchor member 30 further forms a shoulder 42 at the intersection at the main leg portion 36 and the bottom cross surface of the portion 38. An aperture 44 extends through the anchor 30.

As illustrated in FIGS. 1, 2 and 3, the width, $W_1$, of the shoulder 42 is essentially equal to the floor width of the groove 40 which is also substantially equal to the depth (thickness) of the structure members about the notches 18. The main leg portion 36 of the anchor 30 has a length $l_1$. The length of the rectangular-shaped groove 24 has a length $l_2$ which is less than $l_1$. Also, the distance between the shoulder 42 and the bottom of the groove 40 is $l_3$ which is substantially equal to $l_2$. The depth $d_1$ of the groove 24 substantially coincides with the thickness $d_2$ of the anchor member 30.

As best depicted by FIG. 4, to secure the anchor member 30 to the wall structures, the slot 40 is first engaged in abutment with the wall at the end of the groove 24. Then, pressure is applied about the side wall of the main leg portion 36 to urge the shoulder 42 into abutting frictional engagement with the other end wall of the groove 24. As pressure is applied, the tapered wall 41 allows the anchor member to pivot about the point of intersection of the groove 40, wall 41 and end wall of the groove 24. Thus, when the anchor member 30 is in place, it is anchored relative to all four orthogonal directions of the structural member. The top and bottom walls of the groove 24 engage the planar surfaces 32 and 34 of the anchor member 30, and the groove 40 and shoulder 42 are in frictional abutting relationship with the end walls of the groove 24.

When the two structure members 12 and 14 are aligned, the axis of aperture 22 within the member 12 aligns with the center of the channel 20, the axis of opening 44 and the apex of the triangular groove 26. Thus, a locking pin, e.g., a threaded bolt 46 may project through the aperture 22, the channel 20, the aperture 44 and into the groove 26.

The illustrated fastener assembly provides a very economical fastener assembly. For example, wall structures 12, 14 and 16 are generally comprised of aluminum sheet metal formed to shape and dimensions by a stamping machine. During the stamping operation, the notch 18 is readily formed and stamped out during the regular procedure. Also, the apertures 20 are easily included in the stamping operation. Similarly, the anchor members 30 may be stamped out in large volumes at very low cost. The screws 46 may be self-threading so that it is not even necessary to thread the apertures 44 in the anchor member 30.

During assembly, the anchor members 30 may be inserted by an individual without the assistance of any special tools. The individual merely aligns the anchor member 30 in the slot 24 and then applies pressure on the edge to urge it into place. Once in place, the anchor member 30 is secured along all four orthogonal directions and is self-retaining within the notch 18. However, if it becomes desirable to remove the anchor member 30, the individual need only apply pressure along the edge surface of the reverse C-portion 38 to urge it from the shoulder 42. Once removed, the same anchor member 30 may be reinserted or another one substituted therefor.

While, for the sake of clearness and in order to disclose the invention so that the same can be readily understood, a specific embodiment has been described and illustrated, it is to be understood that the present invention is not limited to the specific means disclosed. It may be embodied in other ways that will suggest themselves to persons skilled in the art. It is believed that this invention is new and that all such changes that come within the scope of the following claims are to be considered as part of this invention.

What is claimed is:

1. Faster assembly for mounting and securing two structural members in abutting relationship with each other, comprising:

a unitary planar anchor member having opposing parallel planar surfaces with the outer edges configured to form a main leg portion and a reverse C-shaped portion, the outer edge of said C-shaped portion further forming a top edge cross surface and a bottom edge cross surface intersecting the edge of the main leg portion to form a substantially P-shaped planar configuration, said top edge cross surface further forming a groove of a selected width;

a first planar structural member having a pair of opposing parallel planar surfaces with a composite notch therein, said notch being configured to include a pair of perpendicular intersecting slots forming a substantial T-shaped pattern with the cross member slot of said T-shaped notch extending parallel to the edge of the structural member and the leg slot of said T-shaped notch intersecting the edge of the structural member, the length of said cross member slot being less than the length of said main leg portion of the planar anchor member and at least equal to the distance between the points of intersection of said main leg portion and said reverse C-shaped portion of the planar anchor member and the depth of the structural member at the cross member slot being substantially equal to said selected width; the planar anchor member being press-fit into said cross member slot with the planes of the anchor being perpendicular to the plane of structural member about the notch and with a side edge surface of said main leg portion in abutment with the planar surface of the first structural member and said groove and said bottom edge surfaces of the reversed C-portion in abutment with the interior terminal edge surfaces of said cross member slot; and a locking pin engaging a second structural member and said anchor member with means for locking the pin to the anchor member.

2. The fastener assembly of claim 1 wherein said bottom cross surface of the reverse C-shaped portion has a shoulder of a width substantially equal to the depth of the first structural member whereby the anchor member is in abutting frictional engagement with the first structure about the intersection of said shoulder and said cross member portion of the notch.

3. The fastener assembly of claim 2 wherein said groove and said shoulder each intersect with said main leg portion of the anchor member whereby the side wall surface of the main leg portion abuts the planar surface of the first structural member.

4. The fastener assembly of claim 3 wherein
the unitary anchor member has an opening extending through said parallel planar surface, and
the locking pin is positioned within said opening.

5. The fastener assembly of claim 3 wherein
said notch within the first structural member further includes an opening extending from said cross member slot and in alignment with said leg slot.

6. The fastener assembly of claim 3 wherein
said notch within the first structure member further includes an opening extending from said cross member slot and in alignment with said leg slot, and
the unitary anchor member has an opening extending through said parallel planar surfaces in alignment with said leg slot; and
the locking pin is positioned within said opening of the anchor member and projects within said opening of the notch projecting from said cross member slot.

7. The fastener assembly of claim 6 wherein
said opening in the anchor member is a circular aperture, and
the locking pin is in the form of a self-threading screw.

8. The fastener assembly of claim 6 wherein
said groove in the top cross surface portion of the anchor member has a tapered wall projection from the intersection of the groove with the main leg portion, and
the thickness of the anchor member substantially equals the width of said cross member.

* * * * *